United States Patent [19]

Astil

[11] 3,719,593
[45] March 6, 1973

[54] WATER PURIFYING DEVICE

[76] Inventor: Jaromir Astil, 626 Circle Drive E., Solana Beach, Calif. 92075

[22] Filed: Sept. 25, 1970

[21] Appl. No.: 75,699

Related U.S. Application Data

[63] Continuation of Ser. No. 852,193, Aug. 22, 1969, abandoned.

[52] U.S. Cl. ............... 210/135, 210/136, 210/258, 210/321
[51] Int. Cl. ............................................. B01d 31/00
[58] Field of Search.......... 210/22, 23, 321, 433, 490, 210/491, 136, 257, 258, 135

[56] References Cited

UNITED STATES PATENTS

| | | | |
|---|---|---|---|
| 3,493,496 | 2/1970 | Bray et al. | 210/321 X |
| 3,493,495 | 2/1970 | Mendelson | 210/321 X |
| 3,630,378 | 12/1971 | Bauman | 210/257 |

Primary Examiner—Frank A. Spear, Jr.
Attorney—Carl R. Brown

[57] ABSTRACT

A water purifying device employing a reverse osmosis water purifying element that process feed water under line pressure producing purified product water that is accumulated in a compressible container. The container supplies the product water upon operation of a control valve to a product water supply outlet. The control valve directs feed water under line pressure to compress the compressible container and thus force the product water at line pressure to the water supply outlet. This use of the feed water causes an increased feed water flow through the reverse osmosis water purifying element flushing out the element. A bleed drain, drains off the feed water that is employed to compress the compressible container returning the system to the water purifying and storage condition after delivery of the product water,

11 Claims, 4 Drawing Figures

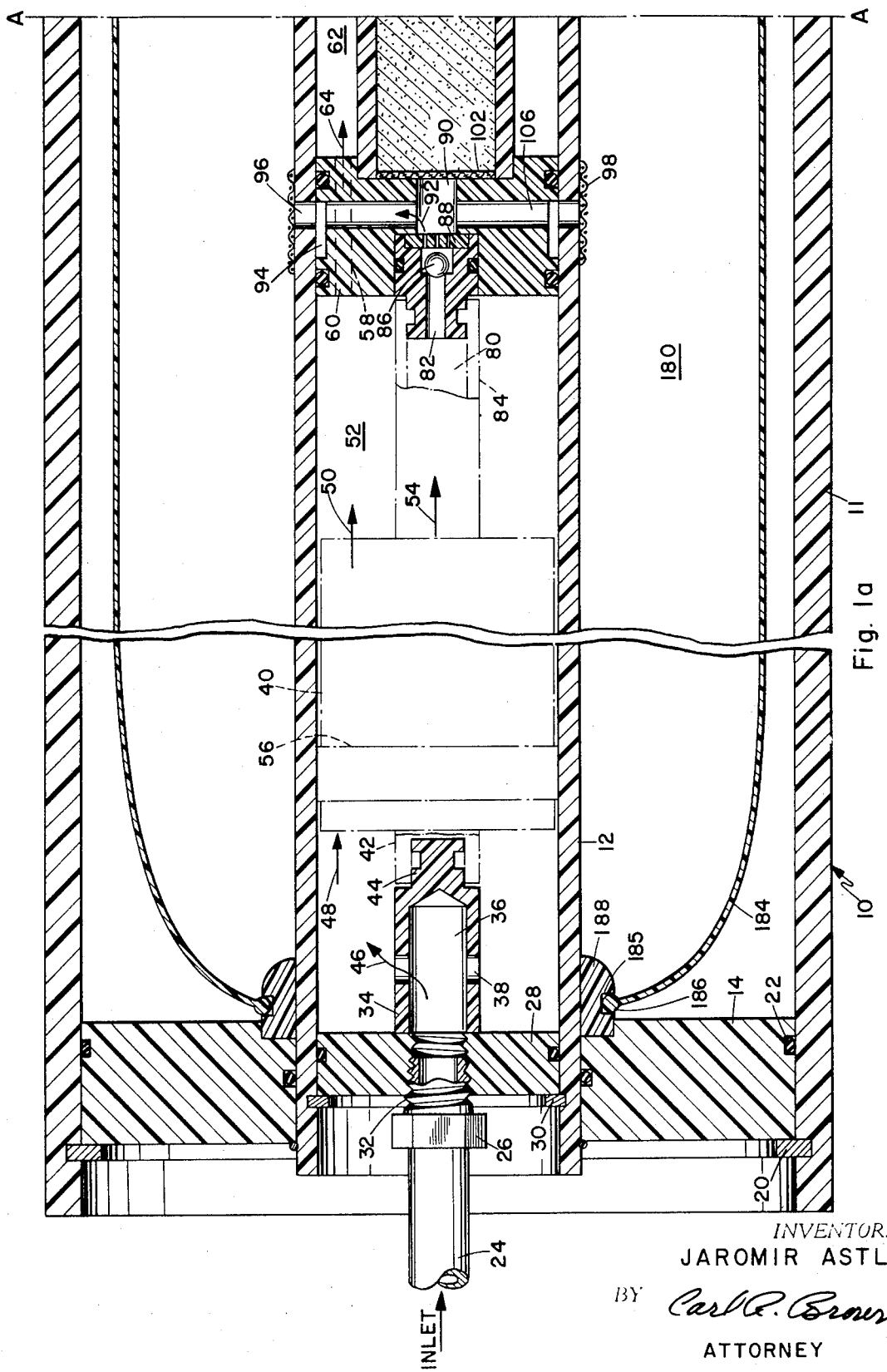

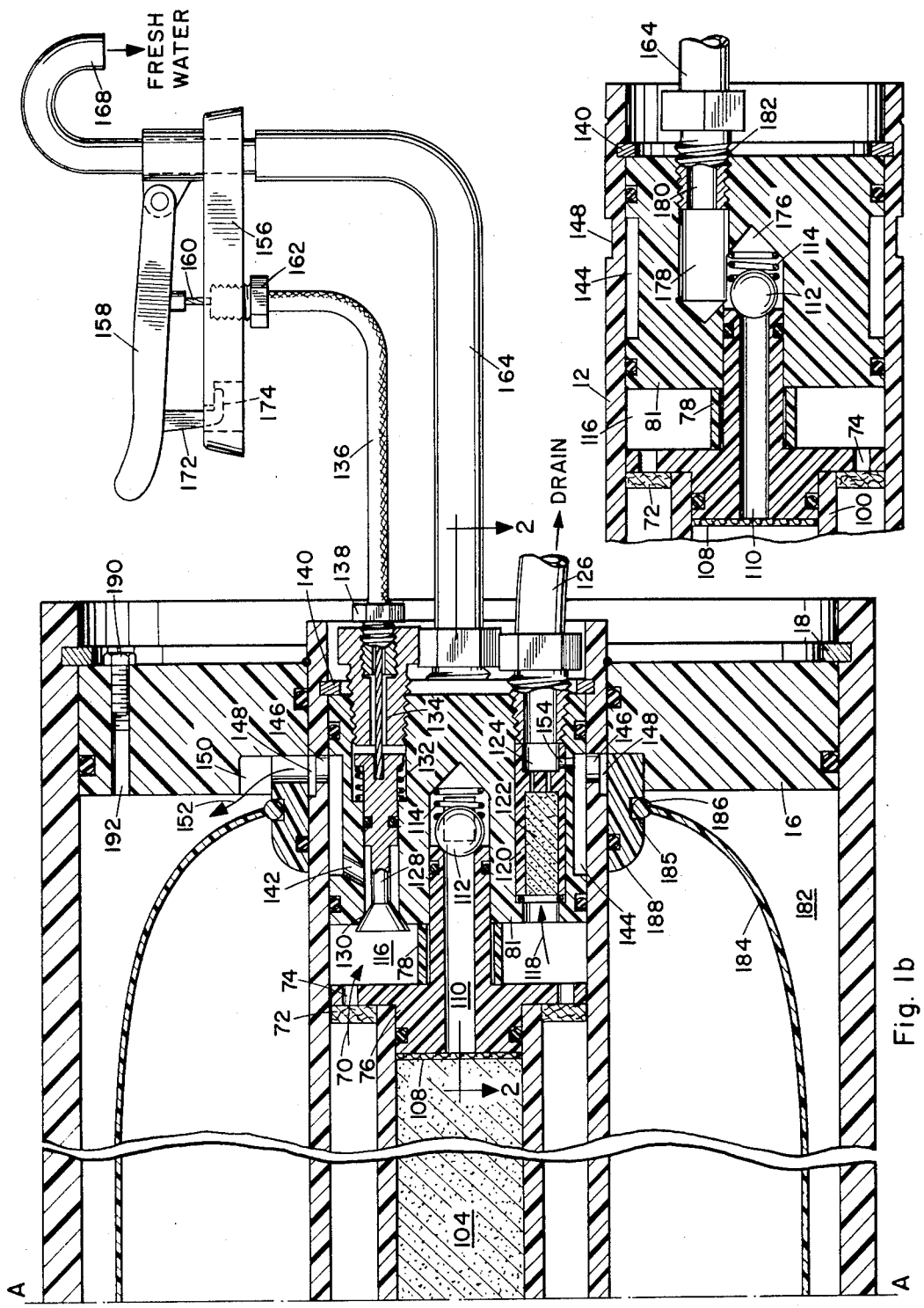

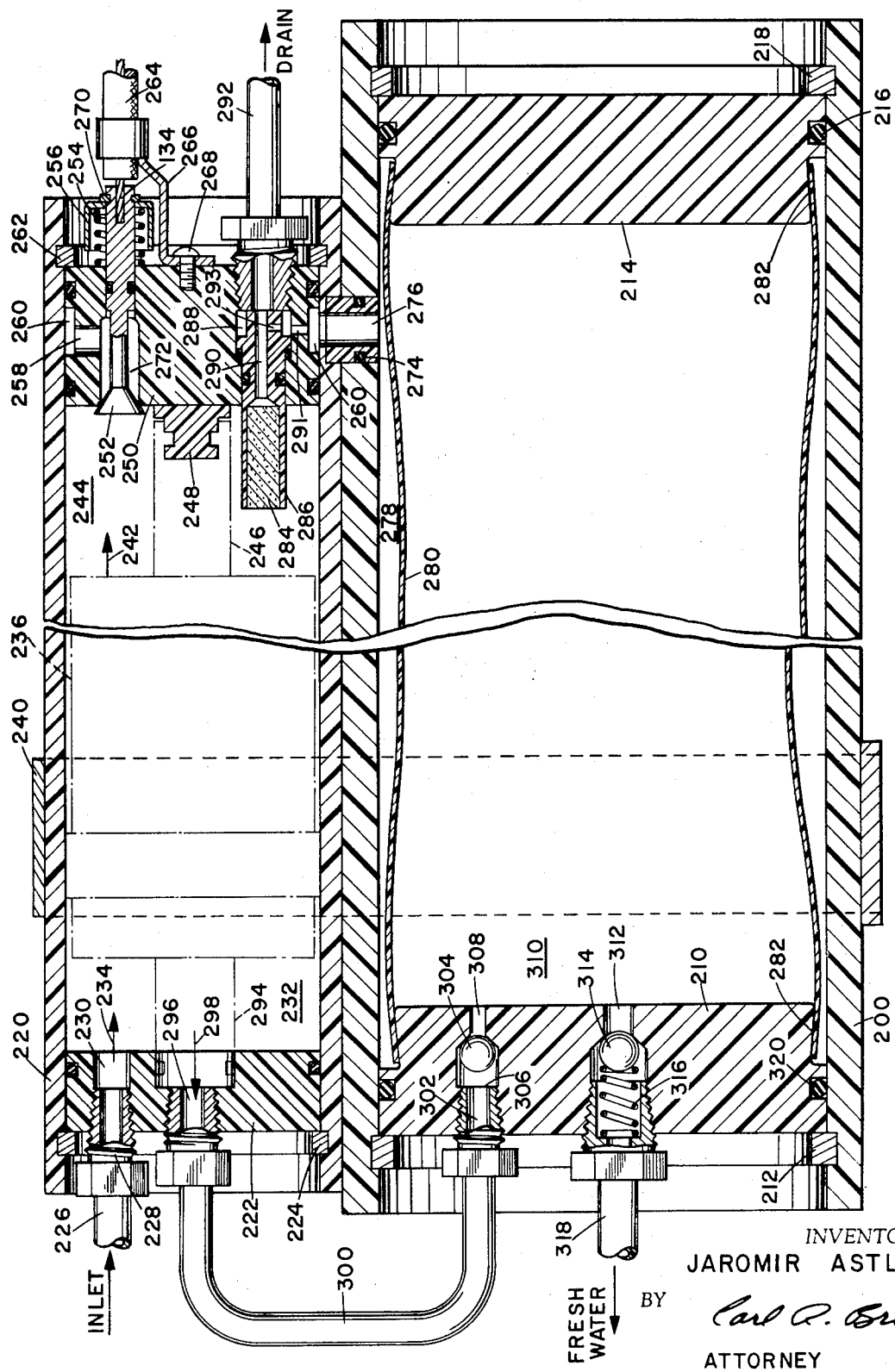

WATER PURIFYING DEVICE

This application is a continuation of an application entitled "A Water Purifying Device," Ser. No. 852,193, filed Aug. 22, 1969, now abandoned.

BACKGROUND OF THE INVENTION

There are existing home drinking water purifying devices that employ reverse osmosis elements. These existing units normally use line water pressure as a driving force for driving water to the reverse osmosis element for purification. The purified or product water is normally stored in a container and the product water is delivered either by a gravity flow or by a secondary pressurization system. The gravity flow devices have the disadvantage of being slow in delivering product water. Accordingly, the gravity flow devices normally require a rather large reservoir installation that makes the device large, heavy, unsightly and expensive to make. The secondary pressurization devices often employ a gas bladder that is initially charged with gas under pressure, which inflated bag is supposed to force product water from an accumulator to a discharge outlet. These devices have the disadvantage of being complex, they deliver product water at different pressures and flow rates, and they suffer from degradation of the gas pressure causing a progressive reduction in the life of the unit and of the pressure in which the product water is delivered. Further such known devices normally employ metal components that are subject to corrosion. Also, the feed water normally passes through such existing devices and the reverse osmosis element at a constant slow flow. This causes an undesirable build up of sediment in the element as well as creating a concentrated polarization condition, known as a boundary layer problem, within the reverse osmosis unit, both of which degrade the overall capacity and efficiency of the devices.

Thus it is advantageous to have a new and improved home drinking water purifying device that is capable of delivering product water at line pressure without requiring the use of secondary pressurization systems, that provides periodic flushing of the reverse osmosis purifying element in an overall structure that may be made of non-corrosive material.

SUMMARY OF THE INVENTION

In an embodiment of this invention, an existing reverse osmosis water purifying element receives feed water to be purified at water line pressure, which feed water passes through the reverse osmosis unit to a feed water discharge outlet with portions of the feed water that is purified passed to a product water storage reservoir. The storage reservoir has a flexible wall membrane that divides its volume into two compartments. One compartment is to receive product water from the reverse osmosis element and the other compartment is connected through a control valve to the feed water discharge side of the reverse osmosis element. When the control valve is opened, the feed water fills the outer compartment compressing the product water in the flexible membrane that forces the product water out the discharge outlet at the line pressure of the feed water. At the same time that the feed water flows through the reverse osmosis element increases, thereby flushing out the reverse osmosis element. When the control valve is closed, the feed water ceases to flow into the outer compartment and delivery of product water ceases, returning the system to the production of product water. A bleed orifice drains the feed water from the outer compartment, which relieves the pressure on the outer surface of the flexible membrane and allows entry of product water delivered by the reverse osmosis purifying element into the inner compartment. Thus the entire unit operates on line water pressure both in the purifying cycle and in the water delivery cycle and flushing of the water purifying unit occurs periodically upon delivery of the product water.

It is therefore an object of this invention to provide a new and improved water purifying device to provide home drinking water employing a reverse osmosis purifying element.

It is another object of this invention to provide a new and improved home drinking water purifying unit that produces product water and delivers the product water at the feed water line pressure.

It is another object of this invention to provide a new and improved home drinking water purifier that is compact in size, and that is made of non-corrosive material.

It is another object of this invention to provide a new and improved home drinking water purifier employing a reverse osmosis purifying element that corrects problems of water delivery in previously known gravity flow and secondary pressurization water delivery systems.

It is another object of this invention to provide a new and improved home drinking water purifier employing a reverse osmosis purifying element in which at frequent intervals, feed water is passed in a rapid rate through the reverse osmosis element causing cleaning and flushing of the reverse osmosis element.

It is another object of this invention to provide a new and improved water purifier device in which full line pressure is available to drive the feed water into the water purifying device and product water is delivered at the point of comsumption at nearly full line pressure.

Other objects and many advantages of this invention will become more apparent upon a reading of the following detailed description and an examination of the drawings wherein like reference numerals designate like parts throughout and in which:

FIG. 1a and 1b is a sectional view, with parts broken away, of an embodiment of the water purifier device of this invention.

FIG. 2 is a sectional view taken along lines 2—2 of FIG. 1a and 1b.

FIG. 3 is a sectional view of a modified embodiment of the invention wherein the water reservoir unit is in a separate housing structure.

Referring now to FIG. 1, a water purifying device 10 has an outer cylindrical shell or housing 11 that may be made of plastic or other suitable non-corrosive materials. The housing 11 has radial slots at each end for receiving snap rings 18 and 20 that hold bulkheads 14 and 16 in position. O-rings, as for example O-ring 22, seals the bulkheads from leaking water therethrough, forming an outer feed water compartment 182. Positioned within the cylindrical housing 11 and bulkheads 14 and 16 is a pressure vessel 12. Pressure vessel 12 houses a reverse osmosis water purifying device 40 that is of known design and which element may be purchased from Gulf General Atomic located in San Diego, California.

Input water to be purified, such as tap water from a normal water system, is supplied at line pressure through tubing 24 to a feed diverter 34. The end of the pressure vessel 12 is sealed by a bulkhead 28 that is held in position by snap ring 30. A normal connector 26 with threads 32, threadably engages the bulkhead 28 and passes water into the volume 36 of the feed diverter 34. The water passes through openings 38 in the direction of arrow 46 and arrow 48 into the reverse osmosis water purifying element 40. A connector 42 coacts with the end 44 of the feed diverter 34 to hold the reverse osmosis element 40 in position. An outer portion 56 restricts water passage around the outer surface of the reverse osmosis element 40 causing the feed water to pass through the reverse osmosis unit 40 in the direction of arrow 50. In accordance with the known operation of the known reverse osmosis water purifying element 40, product water is developed from feed water that passes through membranes. The product water flows in the direction of arrow 54 into the volume 80 of discharge end 84. The feed water flows in the direction of arrow 50 into the cylindrical volume 52, and through opening 58 in the product water manifold 60 to exit in the direction of arrow 64 into volume 62 surrounding a charcoal filter unit 100. The feed water then passes through a filter 72 in the direction of arrow 70 through opening 74 of valve unit 76. Thus feed water flows into the cylindrical cavity 116 where it then flows in the direction of arrow 118 through a flow restrictor 120 positioned in the flow restrictor housing 81. The flow restrictor 120 is filled with washed sand 122 of selected grain size that is saturated with a solution of water in soluble binder of such concentration as to achieve a desired restriction of the feed water flow passing therethrough to outlet 124 and the discharge line 126, that has a failsafe check valve of known design therein (not shown). The function of the flow restrictor 120 is to reduce and regulate the flow of the feed water or brine through the unit to maintain a given desired production of product water in the approximate ratio of 1 to 1.

Thus with the feed water flowing out the outlet discharge 126, the product water flows into cavity 80, through channel 82, around check valve 86, through the openings in disk 88 in the direction of arrow 92 through the holes 106 to the outer cylindrical annulus 94. The product water in annulus 94 thus flows through a plurality of openings 96 around the circumference of the pressure vessel 12 and through a screen 98, that may be made of plastic or of other suitable screen material, into the product water reservoir 180 that is defined by the cylindrical membrane 184. The cylindrical membrane 184 is secured at its opposite ends by bead 186 that fits in cylindrical slots 185 in holding collars 188 that are mounted on the outer surface at each end of the pressure vessel 12. The screen 98 extends along the length of the outer surface of the pressure vessel 12 and functions to prevent the complete collapse of the membrane 184 over the holes 96, and thus prevents sealing off the holes 96 from water flowing therethrough. This allows product water to flow through the screen and distribute over the surface area of the membrane 184 and provide sufficient pressure to force the membrane away from the openings 96 in the product water delivery cycle. A hole 192 may be selectively opened by removing screw 190, in initial operation of the system to allow gas and the like to escape from the outer compartment 182 of the reservoir.

It may be understood that in operation, water purifying device 10 may be positioned horizontally, vertically, or in any other position, as the system operates under water feed pressure. The product water is delivered through outlet line 164, in the manner that will be described in more detail, hereinafter, to a discharge outlet 168. The product water discharge unit has a base 156 with a handle 158 for operating the control valve. Handle 158 is pivotally biased by spring 132 in the upward position where it is retained by a holding member 172 having a hook end 174.

In the product water delivery cycle, handle 158 is depressed forcing a line member 160 through a sleeve 136 held by end connections 138 and 162. The end 134 of line member 160 operates to move control valve 128 from its seat 130 against the resilient force of spring 132. The feed water under line pressure in volume 116 passes through valve seat 130 and through channels 142 into the circumferential annulus opening 144. The feed water then flows through holes 146 into annulus 148 and through the channels 150 in the direction of arrow 152 to the cavity 182, which is the outer part of the water reservoir. Thus feed water has been delivered at full line pressure to space 182 and when this space is filled with feed water, the feed water under line pressure, exerts line pressure force against the flexible membrane 184 and the product water in volume 180. This forces product water back through channel 106 and into volume 90. The increased product water pressure forces ball valve 86 into the check valve closed position, closing off the input channel 82. Product water then flows through the charcoal filter 100 having a charcoal filter medium 104 therein and through filter 108 into the discharge channel 110. Since the product water is under line water pressure at this point, it forces the ball valve 112 against spring 114 opening the check valve (see FIG. 2), and allowing product water to flow through openings 178 and 180 and through the discharge product water outlet connector 182 and output line 164 where it is discharged through the fresh water outlet discharge 168. The product water continues to flow under the pressure of the feed water line pressure in the outer compartment 182 as long as valve 128 is opened or until all of the product water has been discharged from reservoir 180. It will be understood that the opening of the control valve 128, causes a large increase in the flow rate of feed water through the reverse osmosis filtering unit 40, in order to fill the cavity 182. This increased flow rate flushes out the reverse osmosis filtering unit reducing the boundary layer problems within the element.

When handle 158 is released, then spring 132 biases valve 128 to close against the seat 130 closing off the passage of feed water to the outer compartment 182. The feed water then, again flows in the direction of arrow 118 through the flow restrictor 80 and out the drain line 126. Thus the system is returned to normal operating conditions with the product water passing through holes 106 to the reservoir 180. In addition, the feed water in the outer compartment 182 reverse flows through channels 150 into the annulus 148, and through hole 146 to the annulus 144. A bleed orifice 154 allows the feed water to drain into passage 124 and out the feed water discharge line 126. This releases the feed water pressure created in compartment 182, substantially instantly upon the closing of valve 128, thus removing any back pressure to the flow of product water into the compartment 180.

Thus the operation of the single control valve 128 by handle 158 causes the accumulated product water to be discharged at line pressure and further to flush out the reverse osmosis filtering element. Sleeve 78 functions to provide correct spacing of the structure in the unit between the bulkhead 80 held by snap ring 140 and bulkhead 28 held by snap ring 30. As may be observed, O-ring seals are employed throughout the system to provide correct sealing at the appropriate places.

Referring now to FIG. 3, there is illustrated a modified embodiment of the invention wherein the water reservoir is provided in a separate housing from the pressure vessel. In this embodiment, a reservoir housing 200 has end bulkheads 210 and 214 that are held in position by snap rings 212 and 218. The bulkheads have appropriate O-rings 216 and 320 for sealing the outer cavity 278. A flexible membrane 280 is secured in any suitable manner, such as by an adhesive or the like 282. The valve arrangement for providing the ingress and egress of water from the reservoir 200 will be explained in more detailed hereinafter.

A pressure vessel 220 that may have a generally cylindrical shape is secured by a strap 240 to the water reservoir housing 200 holding the units together in the correct position. The pressure vessel housing 220 has end bulkheads 222 and 250 that are held by snap rings 224 and 262 in the correct position in the pressure vessel 220. A known reverse osmosis water purifying element 236, as previously described, is positioned between the bulkheads 222 and 250 and held in position by end connections 248 and the water discharge tube 294.

In operation of the unit, feed water to be purified is delivered at line pressure through pipe 226 and fitting 228 to opening 230 into volume 232. The feed water flows in the direction of arrow 234 through the filtering unit 236 and in the direction of arrow 242 into the cylindrical volume 244. The feed water then discharges through the flow restrictor 286, having the previously described flow restrictor sand filler 284, and through hole 290 out the discharge drain conduit 292, that has an appropriate check valve positioned therein (not shown).

The purified product water passes from the reverse osmosis filtering element 236 in the direction of arrow 298 through discharge tube 294 and through connector opening 296, through line 300, through the discharge connector 302 and through opening 308 into the inner compartment 310 of the reservoir as defined by the membrane 280. When it is desired to discharge product water, then a product water discharge structure, such as previously described in FIG. 1a and 1b, is employed wherein valve handle 158 is depressed forcing the end 134 through an outer sleeve 264 to move the control valve 252 against the force of spring 254. The end of the cable connector 264 is held to the pressure vessel structure by a suitable connector 266 and screws 268. Ring 270 functions to hold the spring enclosure 256 in position. Thus when handle 158 is depressed, valve 252 is opened and feed water flows at line pressure from volume 244 through the valve opening 272 and through holes 258 to the annulus 260. The feed water then flows through opening 276 between the pressure vessel 220 and the reservoir housing 200. A sleeve 274 defines the opening. Thus feed water flows under line pressure into the outer cavity 278. The membrane 280 is either made of stretchable material or of material having sufficient length that the feed water in cavity 278 may completely collapse the volume 310 within the flexible membrane 280 and thus discharge all product water out the discharge opening. When the feed water is discharged into cavity 278, this increased pressure on the product water in cavity 310 is sufficient to overcome the force of spring 316 and move ball check valve 314 from its seat closing the discharge opening 312. The product water then passes out through discharge line 318 and out the discharge end 168. At the same time the water pressure in cavity 310 is sufficient to force check valve ball 304 against its seat 306 thus closing off the input water line 300.

When a sufficient amount of product water has been delivered, hand valve handle 158 is released and spring 254 closes valve 252 causing the feed water to pass in its normal flow through the flow restrictor 286. The orifice 291 drains feed water that was in cavity 278 to annulus 288 and out orifice 293 to the discharge channel 290. Thus the operation of the device in FIG. 3 is substantially the same as that previously described relative to FIG. 1a and 1b, and FIG. 2. Further in the operation of FIG. 3, it may be observed that the rapid flow of feed water during the product water discharge is sufficient to flush out the reverse osmosis water purifying unit 236.

It may be understood that all of the parts previously described in the embodiments of FIG. 1a and 1b and FIG. 3, may be made of plastic or other suitable non-corrosive materials. All of the valve members are similarly constructed of non-corrosive materials with the exception of the springs and like member that are not in contact with the water.

Having described my invention, I now claim:

1. A water purifying device for processing feed water to product water comprising,
   a reverse osmosis water purifying element means for receiving and processing feed water and having a feed water outlet and a product water outlet,
   a reservoir having at least two volumes separated by a movable member with one volume of said reservoir being connected to said product water outlet,
   a transfer passage means for feeding water to the other volume of said reservoir,
   a product water discharge outlet means for discharging water from said one volume of said reservoir,
   means for selectively feeding feed water from said feed water outlet through said transfer passage to said other volume of said reservoir allowing feed water pressure to be exerted on the product water in said reservoir through said movable member, discharging product water through said product water discharge outlet,
   said means comprises a selectively operable control valve means in said passage,
   a feed water discharge outlet communicating with said feed water outlet,
   a flow restrictor in said feed water discharge outlet, said transfer passage being connected to said feed-water outlet between said flow restrictor, whereby opening said control valve means passes feed water into said other volume of said reservoir and before said flow restrictor, increasing feed water flow through said water purifying element, and an orifice drain means for draining feed water from aid volume of said reservoir outside said compressible container and relieving feed water pressure therein when said control valve means is closed.

2. A water purifying device as claimed in claim 1 in which, said movable member comprises an impervious flexible membrane.

3. A water purifying device as claimed in claim 2 including a non-return valve positioned between said product water outlet and said reservoir.

4. A water purifying device as claimed in claim 3 including,
a water filtering unit positioned between said product water supply outlet and said product water discharge outlet.

5. A water purifying device as claimed in claim 1 including,
first and second housings with said first housing positioned concentrically in said second housing,
said first housing enclosing said water purifying element,
and the space between said first and second housings comprises said reservoir.

6. A water purifying device as claimed in claim 5 wherein,
said compressible container is positioned within the reservoir volume between said first and second housing,
and said first housing has holes therethrough for passing product water into said reservoir and for passing product water out said product water discharge outlet.

7. A water purifying device as claimed in claim 1 including,
first and second housings,
said first housing enclosing said water purifying element and said second housing enclosing said reservoir,
conduit means for carrying product water from said product water supply outlet to said reservoir,
non-return valve means for discharging product water from said reservoir,
and means for holding said first and second housings in adjacent positions.

8. A water purifying device as claimed in claim 1 including,
means for bleeding off excess product water through said product water outlet.

9. A water purifying device as claimed in claim 1 in which,
said feed water passing from said feed water outlet through said transfer passage to said other volume of said reservoir being under substantially normal inlet feed water pressure.

10. A water purifying device as claimed in claim 1 in which,
said feed water flow through said purifying element means being substantially increased by said selectively feeding means feeding feed water through said transfer passage, which increased flow flushes said purifying element means.

11. A water purifying device as claimed in claim 1 in which,
said product water in said reservoir is stored at atmospheric pressure.

* * * * *